United States Patent [19]
Coberley

[11] 3,870,936
[45] Mar. 11, 1975

[54] DIGITAL MOTOR CONTROL SYSTEM FOR WEB REGISTRATION
[75] Inventor: Daniel A. Coberley, Danville, Ill.
[73] Assignee: Hurletron Incorporated, Danville, Ill.
[22] Filed: May 25, 1972
[21] Appl. No.: 256,769

[52] U.S. Cl............. 318/85, 318/603, 318/331, 235/92 R, 235/92 CC, 83/74
[51] Int. Cl. ............................................ H02p 5/46
[58] Field of Search ............ 318/331, 142, 85, 603; 235/92 R, 92 CC; 83/74

[56] References Cited
UNITED STATES PATENTS
| | | | |
|---|---|---|---|
| 2,692,361 | 10/1954 | Asbury et al. | 318/142 |
| 3,331,004 | 7/1967 | Brown | 318/331 X |
| 3,360,706 | 12/1967 | Wooldrige, Jr. | 318/331 X |
| 3,377,536 | 4/1968 | Bacquart | 318/331 X |
| 3,586,947 | 6/1971 | Ilk et al. | 318/331 |

Primary Examiner—T. E. Lynch
Attorney, Agent, or Firm—Hill, Gross, Simpson, Van Santen, Steadman, Chiara & Simpson

[57] ABSTRACT

In an illustrated embodiment scanner signals produced by marks of varying intensity on a moving web are effectively transmitted by self-biased capacitively coupled field effect transistors without overloading. The scanner circuit reliably responds to scanner pulses of variable duration and frequency over a wide range without readjustment and includes an inverted current restorer for driving an output transistor stage while providing substantial noise rejection. A servo motor is operable to adjust web errors as signified by the phase of the scanner signal relative to a reference signal, and a thyristor controlled bidirectional drive for the servo motor responds to excessive back voltage due to over-running of the motor to automatically reverse energize the motor. Preferably the timing circuit for the thyristor is coordinated with the input alternating current power to insure that initial turn on of the thyristor in each cycle will accomodate a maximum error signal to the motor.

1 Claim, 14 Drawing Figures

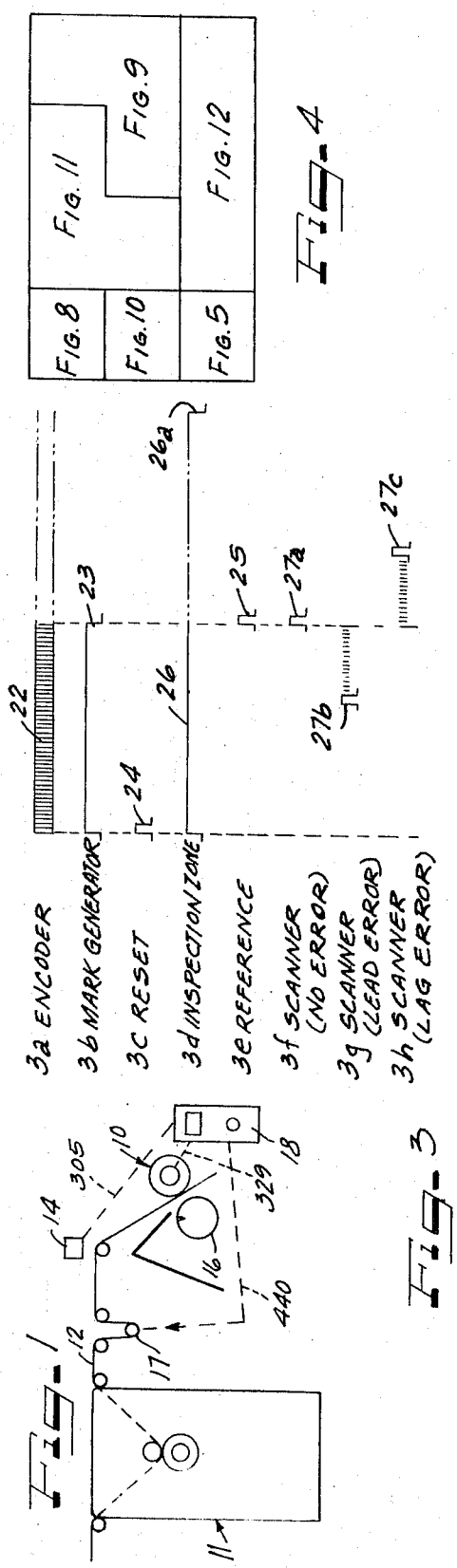

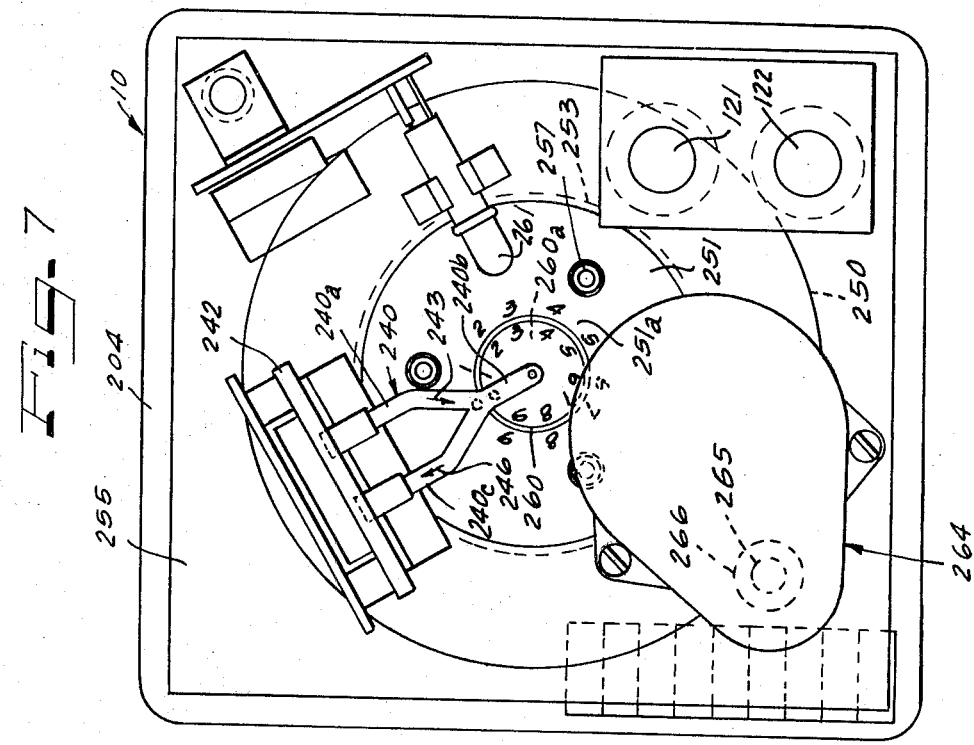
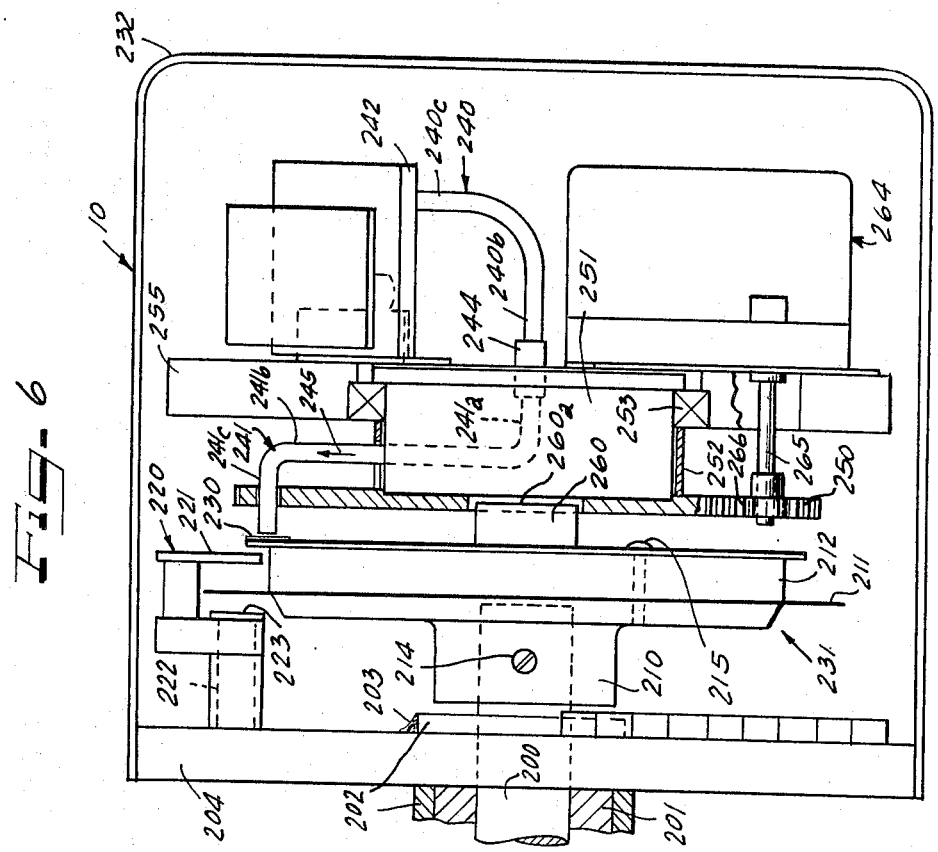

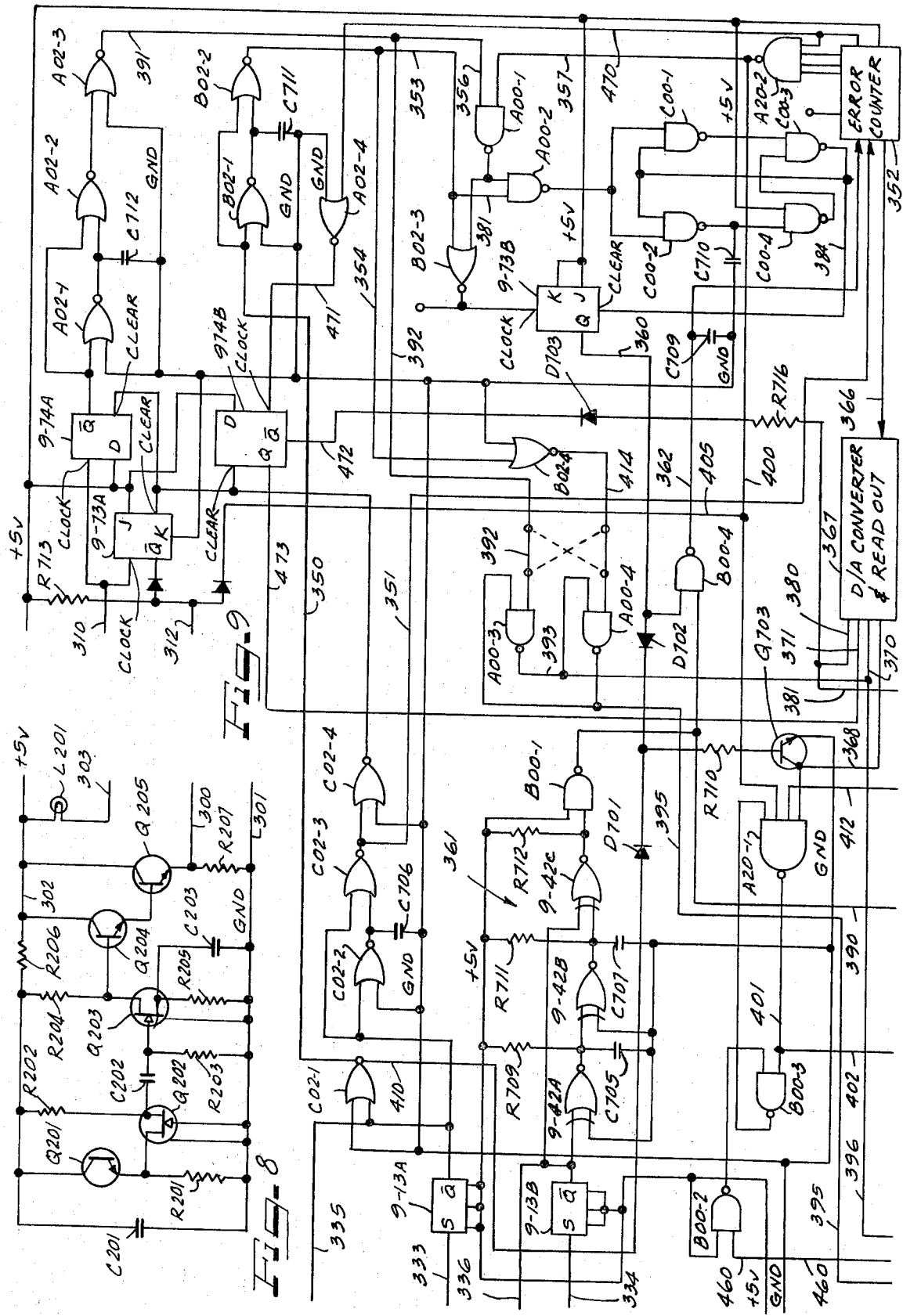

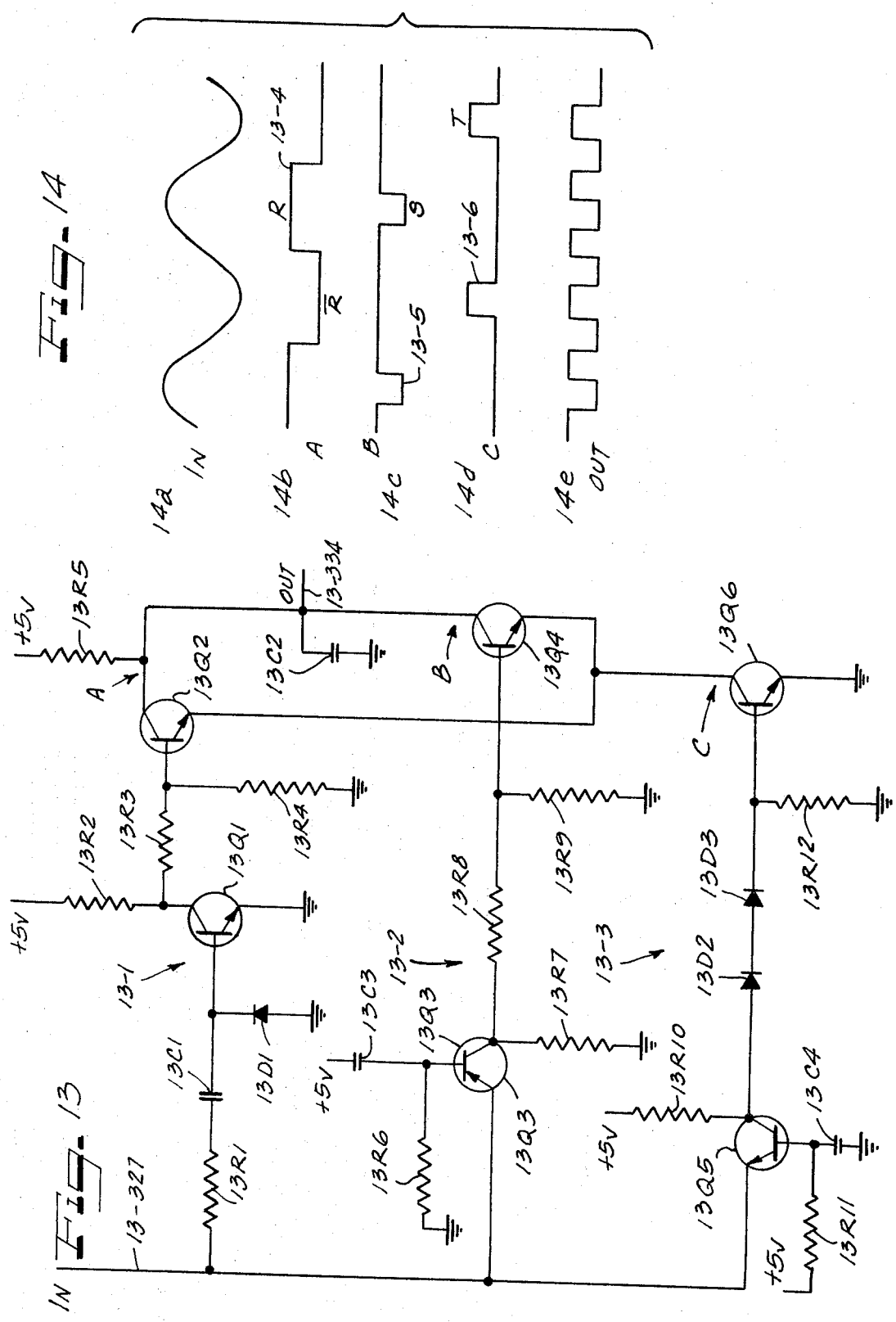

DIGITAL MOTOR CONTROL SYSTEM FOR WEB REGISTRATION

CROSS REFERENCE TO RELATED APPLICATION

For a disclosure of a preferred position detector for the system of the present invention, reference is made to my copending application Ser. No. 256,727 filed May 25, 1972, now U.S. Pat No. 3,812,351, and entitled "Machine Control System."The disclosure of this copending application is incorporated herein by reference in its entirety.

BACKGROUND OF THE INVENTION

In U.S. Pat. No. 3,468,201 issued Sept. 23, 1969 and assigned to the assignee of the present invention, a cylinder position monitor is indicated for producing a zero position pulse once each revolution of a pair of web cutting cylinders. The reference pulse starts a counting interval at the end of which a counter pulse issues for comparison with a scanner signal reflecting web position. The position monitor is to be manually adjusted to approximately define the register condition, with fine adjustment by means of the counter.

In U.S. Pat. No. 3,594,552 issued July 20, 1971 and assigned to the assignee of the present invention, the register condition is established by manual adjustment of a counting chain, without requiring mechanical adjustment of the cylinder position detector.

In U.S. Pat. No. 3,601,587 issued Aug. 24, 1971, and assigned to the same assignee, an improvement over U.S. Pat. No. 3,594,552 is disclosed whereby a required count is automatically established in the counting chain during set up without any mechanical adjustment.

SUMMARY OF THE INVENTION

The present invention relates to a register control system of the general type found in the aforesaid U.S. Patents, but wherein simplified and improved circuitry is provided. The invention also realtes to a register control system incorporating an adjustable position detector for automatic positioning at the angle required to define the register condition relative to successive optically scanned marks on a moving web.

Accordingly it is an object of the present invention to provide a simple and economical yet reliable digital register control system.

A further object of the invention is to provide a web register control system requiring a minimum of adjustment for operation with marks of differing optical characteristics, and with scanner signals of widely varying duration.

Another object of the invention is to provide a web register control system having substantial immunity to noise in the scanner processing circuit thereof.

A still further object of the invention is to provide a register control system providing simple and accurate control of an electric motor in correcting for errors in the register condition.

Other objects, features and advantages of the invention will be readily apparently from the following detailed description taken in connection with the accompanying drawings, although variations and modification may be effected without departing from the spirit and scope of the novel concepts of the invention.

BRIEF DESCRIPTION OF THE DRAWINGS

FIG. 1 is a diagrammatic illustration of a register control system incorporating a rotary position detector and utilizing the features of the present invention;

FIG. 2 is a diagrammatic elevational view of a remote operator's panel and showing controls for operating the position detector of the present invention;

FIG. 3a through 3h (collectively designated FIG. 3) diagrammatically indicate a series of waveforms useful in explaining the basic concepts of the present register control system, FIG. 3a showing a series of encoder pulses, FIG. 3b showing a mark generator pulse, FIG. 3c showing a reset pulse, FIG. 3d indicating an inspection zone, FIG. 3e indicating a reference pulse as produced by the position detector of the present invention, FIG. 3f showing the relative position of a scanner pulse in the absence of an error, FIG. 3g showing the position of a scanner pulse with a lead error, and FIG. 3h showing the relative position of a scanner pulse with a lag error;

FIG. 4 is a diagrammatic view showing the manner in which FIGS. 5 and 8-12 should be arranged to form the complete electric circuit diagram for the present invention;

FIG. 5 is a diagrammatic showing of portions of an electric circuit for remotely controlling the adjustment of a rotary position detector in accordance with the present invention;

FIG. 6 is a diagrammtic side elevational view of a rotary position detector in accordance with the present invention;

FIG. 7 is a diagrammatic end elevational view of the position detector of FIG. 6;

FIG. 8 shows the electric circuit for generating successive scanner signals such as represented in FIG. 3;

FIG. 9 shows a portion of the electric circuit for controlling the error counter which is associated with the error display 21 of FIG. 2;

FIG. 13 illustrates an optional circuit for tripling the input frequency from the position detector 10 and which may be utilized in place of centain circuitry of FIG. 9; and FIG. 14 shows certain waveforms useful in explaining the operation of the circuit of FIG. 13.

DESCRIPTION OF THE PREFERRED EMBODIMENT

Figures 10, 11:
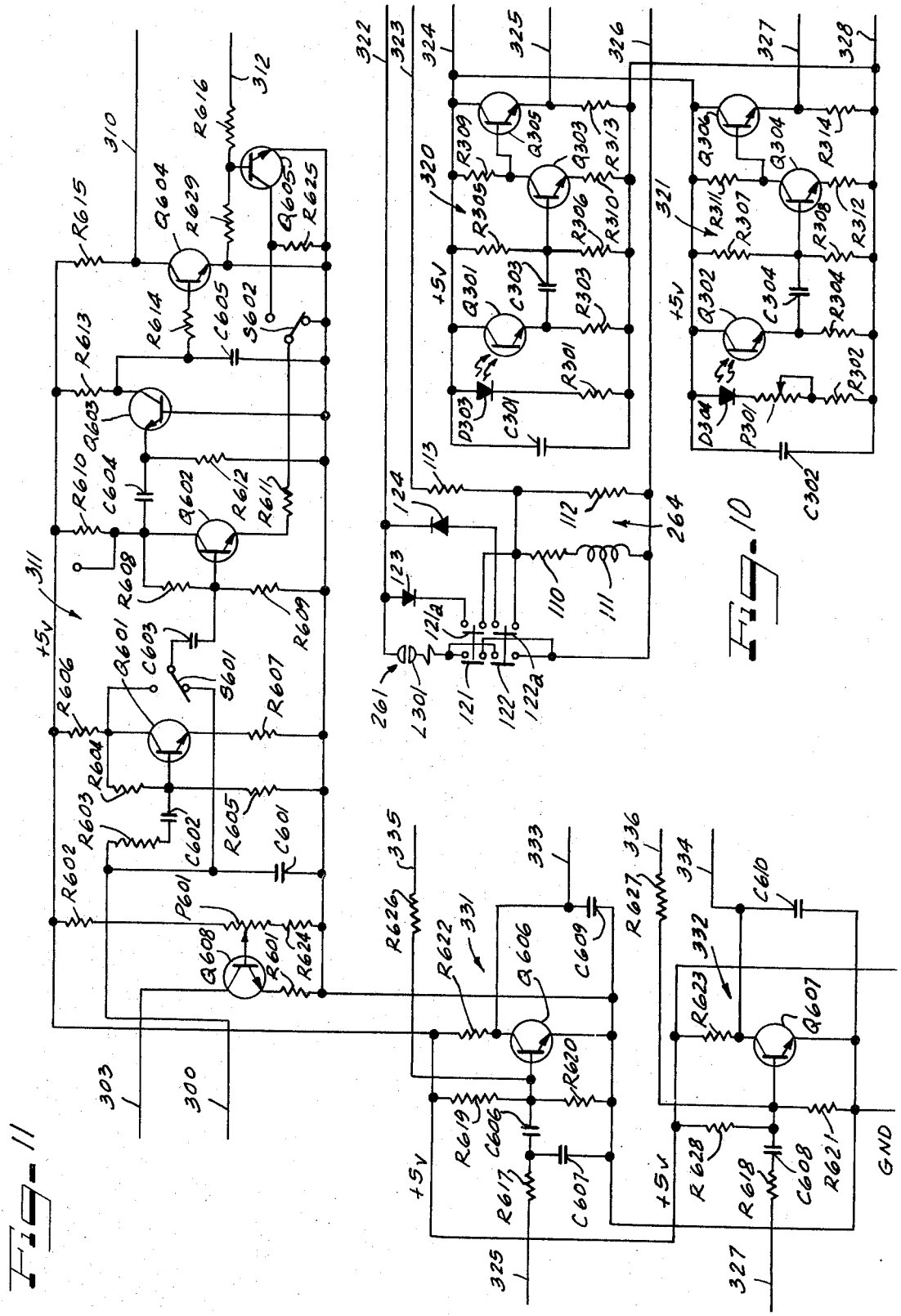
FIG. 10 shows electric circuitry associated with the position detector 10 for generating the mark signal such as indicated at 23 and the encoder signal such as indicated at 22 in FIG. 3.
FIG. 11 shows circuitry for coupling the scanner circuit of FIG. 8 and the generator circuit of FIG. 10 with the circuitry of FIG. 9.

FIG. 1 illustrates a web register control system incorporating a rotary position detector 10 in accordance with the present invention. The system of FIG. 1 further includes a printing unit 11 whereby printing is applied to successive repeat lengths of the moving web 12. As explained, for example, in connection with the second figure of the aforementioned U.S. Pat. No. 3,594,552, a mark may be applied to the web 12 in conjunction with the printed pattern at each repeat length, and such mark may then be detected by means of a scanner located as indicated at 14 in FIG. 1. As diagrammatically indicated in the first figure of the prior Patent 3,594,552, the position of the web relative to a cutting cylinder 16 may be controlled by means of a movable compensating roller such as indicated at 17 in FIG. 1. A web register control unit is diagrammatically indicated at 18 which receives the position detector reference and encoder signals and the scanner signal and controls error compensation by means of the movable compensating roller 17. It will be understood that FIG. 1 illustrates a typical prior art arrangement except for the utilization of the position detector 10 of the present invention. The novel details of the position detector 10 are illustrated in FIGS. 6 and 7. Further, as will be explained in detail hereinafter, during set-up of the system of FIG. 1, the analog error signal which is normally utilized to control the compensating roller 17 may be supplied an actuating motor for the position detector 10 so as to establish an angular position of the position detector defining the register condition of the system.

FIG. 2 shows the details of the front panel of the control unit 18. The front panel may include an error display at region 21 for displaying a two digit number representing the registration condition of the system of FIG. 1. The significance of the error display at 21 can best be understood by referring to the waveform diagram of FIG. 3. FIG. 3a shows a series of encoder pulses 22 as supplied by the position detector 10, each encoder pulse representing a uniform increment of rotation of the position detector. By way of example, each complete revolution of the input to the position detector 10 may produce 2,000 encoder pulses within the digital circuitry of the control unit 18. In particular, the position detector 10 generates 1,000 pulses per revolution, and the number of pulses is doubled in the digital circuitry of the control unit 18 to divide the position detector rotation effectively into 2,000 parts. The mark generator section of the position detector 10 produces a mark generator pulse as indicated at 23 having a duration corresponding to 100 of the encoder pulses 22. The leading edge of the mark generator pulse 23 produces a reset pulse 24, while the trailing edge of the mark generator pulse 23 produces a reference signal such as indicated at 25 in FIG. 3e. After the occurrence of the reset pulse 24, the control unit is capable of accepting a scanner pulse from scanner 14, FIG. 1, at any point within an inspection zone as diagrammatically indicated at 26 in FIG. 3d. FIG. 3f illustrates the case where the scanner pulse 27a occurs in time coincidence with the reference pulse 25, signifying that the system is in register. In this event, the error display region 21 would display +00 indicating a zero error in register. FIG. 3g illustrates the occurrence of a scanner pulse 27b in advance of the reference pulse 25, in which case the display region 21 would show the number of encoder pulses occurring between pulse 27b and pulse 25, the polarity of this error count being minus to signify a lead error. FIG. 3h shows the occurrence of a scanner pulse 27c after the occurrence of the reference pulse 25, in which case the error display region 21 would display the number of encoder pulses occurring between pulse 25 and pulse 27c, a plus sign indicating that the scanner pulse 27c lags the reference pulse 25.

Referring again to FIG. 2, a rocker switch is indicated at 30 which if actuated at the left side thereof will cause "retard" lamp 31 to light, and if actuated at the right side thereof will cause "advance" lamp 32 to light. Rocker switch 30 is operated in conjunction with a function switch 34 having four positions, position number one enabling the rocker switch 30 to control the compensating roller 17 during automatic set-up of the system, position number two providing for adjustment of the reference generator 10 by means of the rocker switch 30, position number three enabling control of the compensating roller 17 by means of the rocker switch 30, and position number four providing for automatic control of the compensating roller 17 so as to tend to maintain register during operation of the system of FIG. 1. In the number four position of the selector 34, rocker switch 30 is connected so as to provide for manual adjustment of the reference generator if desired.

In the lower section of the panel of FIG. 2, reference numeral 37 designates an on-off switch whose condition is represented by "power" lamp 38, while reference numeral 39 shows a manual control for adjusting amplifier gain in the analog control circuit.

FIG. 5

FIG. 5 shows the electric switching elements associated with controls 30 and 34 of FIG. 2. Specifically, a rocker 30 is arranged to selectively actuate switch contacts 51 and 52 between an upper position as shown corresponding to clockwise compensating adjustment, and a lower position corresponding to counterclockwise compensating adjustment. A function switch 34 is mechanically coupled with electrical selector switches 61–65, all of which are shown in position number four in FIG. 5. The number one or lowermost position of selector switches 61–65 is the automatic set-up position, the number two position is the manual reference generator position, the number three position is the manual compensation position, and the number four position is the automatic register control position.

In the circuit of FIG. 5, alternating current power is supplied at terminals 71 and 72 under the control of the manually operated power switch 37 of FIG. 2. When switch 37 is closed, a lamp 38 is energized, and alternating current power is supplied to primary winding 73 of transformer 74, FIG. 5. As seen in FIG. 5, power supply terminal 71 is connected with the cathode of diode 81, the plate of diode 82 and the plate of diode 83. Power supply terminal 72 is connected with the plate of a diode 91, cathode of diode 92, plate of diode 93 and cathode of diode 94.

The compensating roller 17 of FIG. 1 is driven by means of a servomotor having an armature circuit including an armature winding 101, and limit switch contacts 102 and 103 which respectively serve to establish limits in the movement of the compensating roller 17. Thus, when the compensating roller reaches one limit position, contact 102 will open, and the winding 101 can only be energized in the opposite direction away from such limit under the control of a diode 104. Similarly, at the opposite limit position, switch 103 is open so that diode 105 permits energization of winding 101 only in the direction to move off of the limit position. The compensating motor for roller 17 further includes a field winding 107 which is energized with unidirectional pulses of given polarity by virtue of the presence of diode 108. Resistor 109 is included in the circuit in positions number two and number three of selector switch 65 so as to provide a reduced energizing level (and consequent higher operating speed) under conditions of manual control of the system.

In accordance with concepts of the present invention, a second servomotor is provided for effecting angular adjustment of the position detector 10. Angular adjustment of the position detector 10 serves to adjust the point of occurrence of pulses 23, 24 and 25, so that the reference pulse 25 will establish a correct register condition of the system of FIG. 1. This second motor for adjusting position detector 10 includes an armature circuit with a resistor 110 in series with armature winding 111 and a resistor 112 in parallel with components 110 and a resistor 113 for limiting motor energizing current (and thus limiting motor speed) under conditions of remote control of the position detector adjustment.

Push buttons are indicated at 121 and 122 for controlling energization of the circuit 110-112 at a local position adjacent the position detector 10. Thus, actuation of push button 121 completes a circuit from terminal 72, via diode 123, contact 121a of push button 121, and through the circuit 110-112 to the terminal 71. On the other hand, if push buttom 122 is depressed, the circuit extends from terminal 72 through diode 124, contact 122a and then through the circuit 110-112 with opposite polarity of current flow between the terminals 71 and 72.

Under conditions of automatic control, an error responsive control circuit indicated at 130 in FIG. 5 serves to supply an energizing current to the selected one of the motors which is a function of an error signal generated as represented in FIG. 3 in response to system operation. The operation of the circuit 130 is synchronized by means of alternating current power supplied from secondary 131 of transformer 74. The circuit 130 serves to energize primary winding 132 of a transformer 133 with electric current of a phase which is a function of the existing error condition of the system. The control signal from the secondary 134 of transformer 133 is supplied to the TRIAC circuit including TRIAC 135, resistor 136 and capacitor 137 and resistor 138. Thus, the magnitude of the current supplied to selector 61 or 62 from TRIAC 135 depends upon the magnitude of the error in the system of FIG. 1.

By way of example, with the function switch 34 in the number four position for automatic operation of the compensating motor, the output from the TRIAC 135 is supplied to the armature circuit including armature winding 101 via selector switch 61. If a lag error exists as represented in FIG. 3h, armature current flows in a direction to correct for such error, and advance lamp 31 is energized. If a lead error exists as represented in FIG. 3g, then energization of the armature circuit including armature winding 101 will be with a polarity to correct for the lead error, with retard lamp 32 energized.

On the other hand, if function switch 34 is in the number one position, the automatic set-up position, the regulated current from TRIAC 135 is supplied via selector switch 62 and resistor 113 to the motor circuit 110-112 for adjusting position detector 10 until such time as the reference pulse 25 coincides with the scanner pulse such as represented at 27a. When position detector 10 has thus been automatically positioned to eliminate system error during the set-up operation, the function switch 34 may be switched to the automatic number four position, whereupon conpensating roller 17 will be automatically controlled to maintain the established register condition.

It will be observed that in the number four position of the function switch 34 as represented in FIG. 5, it is possible to manually control the position detector motor as represented by circuit 110-112 by means of switch contact 52 of rocker switch 30. In the number two position of function switch 34, the manual reference generator mode, the compensating circuit is disabled, but selector contact 64 and rocker contact 52 enable the manual control of the position detector motor circuit 110-112.

In the number one function position, automatic set-up, the position of selector contact 63 is such as to enable manual control of the compensating motor circuit including armature winding 101 via rocker switch contact 51. Also, in the number three position, the manual compensating position, selector contact 63 enables manual control of the compensating motor by means of the rocker contact 51. The rocker switch 30 is spring biased to an intermediate position where switch arms 51 and 52 are each in an open circuit relation to both of their cooperating stationary contracts.

FIGS. 6 and 7

Referring to FIGS. 6 and 7 there is illustrated a preferred position detector arrangement for generating encoder pulses and mark generator pulses as a function of rotation of an input shaft 200. The input shaft 200 has a bearing sleeve 201 secured therewith and rotatably retained within a cylindrical housing indicated at 202. The housing 202 is shown as being welded as at 203 to a frame member 204.

Carried on the inner end of shaft 200 is a reference disk holder 210, an encoder disk 211, and a clamp plate 212. The reference disk holder 210 is fixedly secured for rotation with shaft 200 by means of a set screw as indicated at 214, and the clamp plate 212 is fixedly secured for rotation with the disk holder 210 by means of screws such as indicated at 215. The encoder disk 211 in the illustrated embodiment is provided with a series of 1,000 radial slots in the outer periphery thereof. An encoder subassembly is indicated at 220 which cooperates with the encoder disk 211 to generate a series of 1000 pulses per revolution of the encoder disk 211. A light emitting diode is carried by means of board 221 so as to emit light in an axial direction toward the slotted periphery of encoder disk 211. A receiving photocell assembly generally indicated at 222 a reticle or slotted mask 223 having a series of ten slots for matching alignment with respective slots at the periphery of encoder disk 211. Thus, at an instant of registry of successive slots at the periphery of encoder disk 211 with corresponding slots of reticle 223, light is transmitted from the diode of diode board 221 along ten parallel radially elongated paths into the interior of the photocell 222. The photocell includes a photo transistor which is responsive to registry of the slots of the encoder disk and reticle to transmit an encoder pulse. Thus, as the input shaft rotates, a series of encoder pulses is generated, and, for example, 1,000 encoder pulses may be generated at uniform intervals during one complete revolution of the input shaft. The retide 223 may be of circular configuration, and the slots may be vertically oriented. The central slot of the series of ten may have a length corresponding substantially to the effective diameter of the cylindrical aperture of the photocell 222. The other slots may be parallel to the central slot and of progressively reduced length in conformity with the area of registration thereof with the aperture of the photocell 222.

A mirror is diagrammatically indicated at 230 in FIG. 6 fixedly secured to the periphery of clamp plate 212. The mirror 230 constitutes a segment presenting a differential light transmission property and having a limited extent in the direction along the circular path of movement thereof. The parts 210, 211, 212 and 230 may constitute a rotatable position detector assembly 231 which is mounted for rotation with the input shaft 200. The segment or mirror 230 thus defines by its position about the axis of the position detector assembly 231 a distinctive angular position of the assembly.

Cooperating with the mirror 230 is a light transmission system including a bifurated fiber optic light path member 240 and a rotatable fiber optic path element 241. A circuit board generally indicated at 242 carries a light emitting diode which registers with branch 240a of member 240 for transmitting light along a path such as indicated by arrow 243 in FIG. 7. The emitted light from the diode enters a common light path section 240b which registers with an axially extending portion 241a. Axial light transmission section 241a is maintained in alignment with common section 240b by means of a sleeve such as indicated at 244 which maintains the axial alignment while accommodating rotation of the light transmission element 241. The emitted light is transmitted from the axial section 241a radially along a section 241b as indicated by arrow 245 and then is directed axially by means of a section 241c so as to be directed toward the path of the light reflective mirror 230.

When the mirror 230 comes into registration with axially directed section 241c in each revolution thereof, light is reflected back along the element 241 and back to the axially directed section 240b of member 240. A portion of the reflected light then enters the branch path 240c, FIG. 7, as indicated by by arrow 246, so as to impinge on a photo transistor in alignment with section 240c and carried by the circuit board 242. Thus, a pulse of light impinges on the photo transistor during each revolution of the detector assembly 231 as the mirror 230 moves into registration with the light pipe element 241. By angularly adjusting the transmission element 241, any desired point in the path of mirror 230 may be selected as the point at which the reference generator signal is to be produced. In the preferred commercial arrangement, a clearance distance of substantially 0.031 inch is maintained between the tip end of the light path section 241c, and the adjacent surface of mirror 230 so that there is an air gap therebetweeen without any mechanical contact between the segment 230 and the conduit 241c. Further, all of the electrical connections are made to stationary points on the circuit board 242, and there is no requirement for electrical connection with the rotating section 241.

To effect selective angular adjustment of the light path element 241, the same is associated with a gear assembly including a gear 250, optic window 251 and spacer 252, all of which are retatably carried by means of a ring bearing 253. The spacer 252 is provided with a slot as indicated at 252a through which the radial section 241b of pipe 241 extends. The gear 250 is provided with an axial aperture through which the axially extending end portion 241c of the light transmission element 241 extends. The bearing 253 is carried on a mounting plate 255 which forms part of the frame of the position detector 10. Machine screws such as indicated at 257, FIG. 7, secure the optic window 251 to the gear 250.

The position detector assembly 231 is provided with an axially projecting hub portion 260 integral with clamp plate 212 and having a cylindrical end face 260a which is visible through the optical window 251 as indicated in FIG. 7. The end face 260a is provided with a series of integers at the outer perimeter thereof, and the optical window 251 is provided with a series of integers in the region 251a radially outwardly of the hub portion 260 so that the angular relationship between the rotary assembly 231 and the angularly adjustable light pipe section 241 can be observed. To facilitate such observation, a light source is provided as indicated at 261 mounted on the plate 255 and arranged to direct light onto the region of the series of numbers shown in FIG. 7. A reference motor is indicated at 264 having an output shaft 265 carrying a gear 266 meshing with a gear 250. Thus, energization of the motor 264 serves to move the gear 250 angularly and thus to angularly adjust the light pipe section 241. The energization of motor 264 may be controlled by means of push buttons 121 and 122 whose electrical function has been described in reference to FIG. 5. Depressing one of the push buttons 121 and 122 will serve to drive the light pipe section 241 in one angular direction, while actuation of the other push button will serve to drive the light pipe section 241 in the opposite direction. The armature winding 111 of motor 264 is shown at the lower right in FIG. 5. As previously explained, in the number 2 position of function switch 34, FIG. 2, the position detector motor 264 can be manually controlled by means of rocker switch 30. In position number 1 of function switch 34, motor 264 is automatically controlled from circuit 130, FIG. 5, so as to reduce the error count value to zero by angularly adjusting light pipe 241 to an appropriate position such that the reference pulse 25 coincides with the scanner pulse such as 27a in each repeat length of the web 12. Such automatic set-up control of motor 264 is possible once the position of the light pipe 241 is such that the error count is less than a predetermined maximum value as represented by the inspection zone 26 in FIG. 3.

SUMMARY OF POSITION DETECTOR FEATURES

As will be apparent from the foregoing description, input shaft 200, FIG. 6, of position detector 10 is rotated by the press in exact synchronism therewith. For example, the position detector assembly 231 may rotate in precise synchronism with the cut off cylinder 16. Further, the movement of the web may be substantially in step with the rotation of the cutting cylinder 16 so that each encoder pulse from the position detector 10 represents a uniform increment of rotation of the cutting cylinder 16 and a uniform increment of movement of the web 12, FIG. 1. With the press in operation, a scanner 14 will produce a scanner signal such as indicated at 27a in FIG. 3 for each repeat length of the pattern on the web 12. Further, each time the mirror 230, FIG. 6, comes into registry with the light transmission pipe section 241c, light is reflected along the branch path indicated at 240c, FIG. 7, to actuate a photo transistor and ultimately produce a mark generator pulse as represented at 23 in FIG. 3. The leading edge of the mark generator pulse 23 produces a reset pulse 24 and the trailing edge of the mark generator pulse produces a reference pulse as indicated at 25.

The set up of each unit may be done manually from marks in the printing area, or semi-automatically from marks in a clear track on the web. Thus, when connecting the mark generator or position detector assembly 10 to the press it is not necessary to time or align it to the printing cylinder. The system can accept the mark generator reference pulse at any point through 360°.

In setting up the register control, the press is operated and register is maintained with the use of the rocker switch 30, with the function switch 34 in the number 3 manual compensation position. When the register condition is substantially obtained, the function switch 34 is shifted to the number 2 position, the manual reference generator position, and the rocker switch 30 is actuated until the error read-out at window 21 of the register unit 18 is below 99. The function switch 34 is then shifted to the number 1 automatic set-up position, whereupon control circuit 130, FIG. 5, automatically controls the motor 264 so as to angularly adjust the light pipe 241 to correspond to the register condition. When the read-out numbers at the indicator 21 are around 00 (plus or minus two to three counts), the function switch 34 is moved to the number 4 automatic register control position, whereupon the control circuit 130 controls the compensating motor armature circuit including armature winding 101, FIG. 5, so as to automatically maintain the established register condition.

When the register mark is not in a clear track on the web, for example, the system is set up by operating the press and obtaining a manual register with the function switch 34 in the manual compensating position. The press is then stopped and the register mark is inched under the scanner 14, and the function switch 34 set to manual reference generator position. The local push-buttons 121 and 122, FIG. 7, at the reference generator 10 are then actuated until the numbers on the hub portion 260a are in line with the corresponding numbers of the outer series indicated at 251a, FIG. 7. When the alignment is completed so that the numbers are aligned as shown in FIG. 7, the function switch 34 is set to the auto set-up position and the press is once more set in operation. When the readout numbers at indicaor 21, FIG. 2, are around 00 (plus or minus two to three counts), the function switch 34 is moved to the automatic register position (function switch position number 4).

During operation of the system, if the correction tolerance is too wide, the amplifier gain control knob 39 is adjusted in the clockwise direction. If the amplifier gain potentiometer is turned too high, it may cause the cut-off cylinder 16 to hunt about its proper relative position to the web because of trying to correct for variations in the web caused by mechanical press conditions. If a change in register advance or retard is desired after switching the function switch 34 to the automatic register position, the advance or retard rocker switch 30 may be actuated, observing the readout at 21. The amount of correction made will be indicated by the number change on the readout panel and this is the same as an error indication to the unit. The compensator motor will run to bring the reference mark and scanner mark into coincidence again.

Modifications and Variations

It should be understood that the light transmission means including fixed light path section 240 and movable light path section 241 may be energized from a source of infrared light or light of other suitable wave length of other characteristics. The light path provided by the light transmission means may be coherent, and the light path from the source to the segment 230 may be separate from the return light path for reflected light leading to the stationary light responsive element. With a coherent light source, the energy transmitted may be essentially monochromatic and concentrated to a higher energy level than the source of the radiation. A coherent wave front as produced by a coherent light source produces a uniform wave pattern, as contrasted with a spacially incoherent radiation where light emerges as a number of separate waves that reinforce or cancel each other in a random fashion. As another alternative, the source and receiver of the light may occupy the same region corresponding to the cross section of the light section 240b. For example, the source may be located to transmit light along a central circular cross section part of the overall cross section of 240 b, and the return light along an outer annular part of the cross section of 240b may impinge on the phototransistor or other light responsive element. The gear 250 is provided with teeth continuously about the perimeter thereof so that the light path section 241 can be continuously rotated to an unlimited extent in a given direction.

Scanner Ciruitry of FIG. 8

The circuitry for the scanner assembly of 14 of FIG. 1 is shown in FIG. 8 and comprises a phototransistor Q201 which works into a common gate field effect transistor Q202 and then to a common drain field effect transistor Q203. The output of transistor Q203 is supplied to a pair of Darlington emitter followers Q204 and Q205, to provide approximately one half volt signal at output line 300 relative to ground potential at line 301.

A lamp L201 is energized from supply line 302 which is maintained at a potential of plus 5 volts. Conductor 303 leading from lamp L201 is connected by means of a suitable cable along with lines 300–302 with the control unit 18 as indicated by a dash line 305 in FIG. 1.

The lamp L201 and the phototransistor Q201 are arranged mechanically in the scanner assembly 14 so that their self-contained lenses are sufficient for focusing on a web at a distance of three-sixteenths inch through a blue filter. The field effect transistors Q202 and Q203 are operated in such a way as to require essentially no bias and sensitivity adjustments in the scanner circuit while operatively responding to pulse signals of widely varying duration including very long pulse durations in the neighborhood of one second. Thus scanner marks with varying backgound coloration and varying intensities and sizes of marks can be utilized without requiring any substantial adjustment of the scanner circuit. The input field effect transistor Q202 supplies voltage amplification of the pulses from the phototransistor Q201, while the field effect transistor Q203 which is coupled with the output of transistor Q202 by means of capacitor C202 provides power amplification of the output signal. Transistor Q203 is self-biased by means of resistor R205 and capacitor C203 so as to accommodate a wider range of input signal amplitudes without overloading. The high input impedance of the field effect transistor Q203 makes capacitive coupling between Q202 and Q203 possible without requiring extremely large size capacitance values for C202, while yet operatively responding to very long and very low pulse rates.

Typical values for the components in FIG. 8 are as follows: C201, 22 microfarad, Q201 Texas Instruments Type LS406, R201, 150 kilohms, R202, 100 kilohms, Q202, Type 2N4221, C202, 1 microfarad, R203, 10 megohms, Q203, Type 2N4221, R204, 100 kilohms, R206, 1 kilohm, R205, 150 kilohms, C203, 100 microfarads, Q204 Type 2N3704, Q205, Type 2N3566, R207, 220 ohms one half watt, L201 Type 253X.

FIGS. 9–11

Scanner Processing Circuitry of FIG. 11

The scanner signal from Q205 is supplied via conductor 300 to the scanner processing circuit shown at the upper part of FIG. 11 which includes transistors Q601 and Q602. Transistor Q601 may be bypassed by means of switch S601, by placing the switch in the lower position as actually shown in FIG. 11. Switch S601 is placed in the upper position when the scanner is to sense a light colored mark against a dark background, and is placed in the lower position when the scanner is to sense a dark colored mark against a light background. A signal of proper polarity is then supplied to transistor Q602 which is operated as a class A B amplifier and is biased nearly at cutoff. A transistor has been picked for Q602 that has a beta proportional to collector current such that the more signal current is supplied to the transistor, the greater the gain. Thus noise signals which generally are of lesser amplitude will not receive as much amplification as larger signals which will normally be produced by the desired marks on the web. The amplifier circuit of Q602 then drives a direct current restorer circuit including capacitor C604 and the diode provided by the base-emitter junction of transistir Q603. The restorer circuit operates in such a way that the capacitor C604 will have a direct current potential thereacross at the most negative collector swing of transistor Q602, and this direct current potential across capacitor C604 is gradually increased through a charging circuit formed by resistor R610, capacitor C604 and resistor R612. Resistor R612 may have a value of 220 kilohms for example, such that there is an appreciable time delay before transistor Q603 can respond to a further signal. The time constant of the recharging circuit including resistor R610 and resistor R612 is substantially greater than the time constant of the discharge circuit, which extends from the collector to the emitter of transistor Q602 and through resistor R611, switch S602 and the base-emitter path of transistor Q603. The time constant of the charging circuit for capacitor C604 while having a substantial value in comparison to the time constant of the discharge circuit, still is consistent with enabling response of transistor Q603 to scanner signals with the minimum time spacing therebetween for which the system is to be operative. It will be noted that the discharge circuit includes the base-emitter junction of transistor Q603 so that transistor Q603 is driven during the discharge cycle of capacitor C604.

Thus, with transistor Q602 turned off, the collector of Q602 would be at a relatively high potential, and capacitor C604 would be gradually charged to plus 5 volts. If now, a scanner signal is received at the base of Q602 such as to drop the potential of the collector of Q602 to a value of plus one volt, for example, capacitor C604 would discharge through the base-emitter junction of Q603, the discharge rate being determined by the collector-emitter resistance of Q602, the relatively small value of resisitance of R611 (for example 47 ohms), and any resistance which might be introduced with the switch S602 in its upper position. The discharge current that passes through the base-emitter junction of Q603 serves to turn on this common base stage so as to produce a sharp negative-going pulse at the collector of Q603. Then, after the mark passes the scanner, the Q602 collector goes high to permit the recharging of capacitor C604 under the control of R612. If during recharging, a further pulse appeared at the base of Q602, the output of Q602 would not be sufficient to forward bias the base-emitter junction of Q603 unless sufficient time had elasped to permit enough charge to be supplied to capacitor C604. Once the direct current potential across capacitor C604 had reached a sufficient value to forward bias the base-emitter junction of Q603, the circuit is ready to respond to a further scanner pulse of sufficient amplitude. The current into the restorer circuit during discharge of capacitor C604 is converted through the common base amplifier of Q603 to a voltage signal which may be termed the scanner signal. This scanner signal is amplified by voltage amplifier Q604 so as to provide an output at conductor 310 suitable for driving transistor transistor logic (TTL) at a 5volt level. Thus the raw scanner signal supplied at input 300 in FIG. 11 is converted by means of the processing amplifier generally designated by reference numeral 311 to an output scanner signal of potential level compatible with transistor logic circuitry to be actuated thereby. The resistance of resistor R612 is chosen such that even a high repitition rates of the scanner signals supplied to transistor Q602, there will be substantial charge on capacitor C604 prior to each successive discharge cycle. The time required to discharge the charge on capacitor C604 may be termed the restoring time of the circuit, and the pulses appearing at output conductor 310 will have an amplitude of approximately five volts and a width corresponding to this restoring time.

If it is desired to blank out operation of the processing circuit 311 during the time interval ouside of the inspection zone indicated at 26 in FIG. 3, switch S602 may be placed in its upper position, where upon transistor Q605 must be turned on via conductor 312, before the processing circuit 311 can respond to scanner signals supplied at 300.

Transistor Q608 at the left hand side of FIG. 11 is controlled by means of a potentiometer P601, and in turn controls the current supplied to scanner lamp L201, FIG. 8 since lamp L201 is series via conductor 303 with the collector-emitter path of transistor Q608.

Exemplary Circuit Values For The Processing Amplifier 311, FIG. 11

Examplary circuit values for the procesing amplifier 311 are as follows: Q608 type 2N2102, R601 4.7 ohms 2 watts, R602 33 ohms, P601 100 ohms, R624 100 ohms, C601 one tenth microfarad, R603 100 ohms, C602 22 microfarads, R606 1 kilohm, R604 27 kilohms, R605 4.7 kilohms, Q601 type 2N3859, R607 47 ohms, C603 100 microfarads, R610 1 kilohm, R608 30 kilohms, R609 4.7 kilohms, Q602 type 2N3391, C604 100 microfarads, R611 47 ohms, R612 220 kilohms, R613 47 kilohms, Q603 type 2N5089, C605 0.01 microfarad, R614 10 kilohms, R615 1 kilohm, Q604 2N3566, R629 1 kilohm, R625 470 ohms, Q605 type 2N4124, R616 22 kilohms.

Position Detector Circuitry of FIGS. 10 and 11

FIG. 10 shows a light emitting diode D303 and phototransistor Q301 which are associated respectively with the branches 240a and 240c of light pipe 240 of FIG. 7. At the lower part of FIG. 10, there is illustrated a light emitting diode D304 which is carried on diode board 221 shown at the upper left of FIG. 6. Phototransistor Q302 is operatively associated with photocell 222 so as to receive light from the diode D304 upon each registration of the slots at the periphery of encoder disc 211 with the corresponding slots of reticle 223, FIG. 6. Circuitry 320 in FIG. 10 is thus concerned with processing of the pulses supplied by phototransistor Q301 so as to produce a mark generator pulse as indicated at 23 in FIG. 3 for each revolution of the photodetector assembly 231, FIG. 6. Circuitry 321 associated with phototransistor Q302 is concered with the production of a series of 1,000 encoder pulses for each revolution of the photodetector assembly 231, these 1,000 encoder pulses being doubled to produce 2,000 encoder pulses per revolution of the encoder detector assembly 231 as represented at 22 in FIG. 3. By way of example, position detector assembly 231 may be coupled so as to be driven in one to one relationship with the cut-off cylinder indicated at 16 in FIG. 1. The circuits 320 and 321 may be physically contained within the housing of position detector 10, FIG. 6, and conductors such as indicated at 322–328 may be connected by means of a suitable cable (indicated at 329, FIG. 1) with the web control unit 18, FIG. 2. Thus, conductor 322 is electrically connected with the alternating current power common terminal 72, FIG. 5, while conductor 323 is connected with the terminal of contact 64 of function selector switch 34, FIG. 5. Conductor 324 is connected with the plus 5-volt output terminal of the power supply (not shown), and conductor 328 is connected with the ground terminal of this power supply. conductor 325 supplies the mark generator pulse 23 from circuit 320, and conductor 327 supplies encoder pulse output from amplifier circuit 321. Conductor 326 is connected with terminal 71 of the alternating current power which may be at the commercial power supply frequency of 60 cycles per second.

In a commercial embodiment of the system, diode D303 is implemented as a type 40844R diode for emitting infrared light which is transmitted via branch 240a of the fiber optic light pipe 240. The fiber optic Y randomly combines two equal bundles of fibers at the common section 240b, the other bundle being coupled via branch 240c to the phototransistor Q301. The combined bundle projects through another fiber optics bundle provided by the rotatable light pipe 241. The light pipe 241 projects the infrared light to the reflector 230 which may be 18° in the direction of rotation of the position detector assembly 231. The light pipe 241 can be rotated by means of motor 264 whose electric circuit is indicated at the left in FIG. 10 as well as at the lower right in FIG. 5. Since motor 264 can rotate light pipe 241 continuously in a given direction, the arrangement provides for an infinite phase adjustment for the phase of the mark generator signal 23 relative to the position of the input shaft 200, FIG. 6. Lamp L301 shown at the upper left in FIG. 10 is part of the lamp assembly 261, FIG. 7, and is energized whenever pushbutton 121 or 122 is engaged, the lamp L301 being arranged to illuminate the numbers on the inner disk indicated at 260a in FIG. 7.

The preamplifier circuits 331 and 332 for amplifying the mark generator signal from conductor 325 of circuit 320 and for amplifying the encoder signals from conductor 327 of circuit 321 are illustrated at the lower left in FIG. 11. Both circuits are similar in operation. The signal from the mark generator conductor 325 is coupled to the base of Q606 which is a class A amplifier biased on by R620 and R622. The signal to the base of Q606 will give a positive going signal on the collector which is transmitted via conductor 333. similarly Q607 is a class A amplifier which is based on by R621 and R623, the signal to the base of Q607 giving a positive going signal on the collector which is transmitted to output conductor 334.

Exemplary Circuit Values For the Position Detector Circuitry of FIGS. 10 and 11

The following are examplary circuit values for the components of FIG. 10 and for the lower portion of FIG. 11 which forms preamplifiers 331 and 332: D301 type 1N2071, D302 type 1N2071, Resistor 110 820 ohms 2 watts, Resistor 112 500 ohms 8 watts, Resistor 113 47 ohms 2 watts, C301 22 microfarads, D303 type 40844R, R301 68 ohms 1 watt, Q301 type MDR3056, C303 100 microfarads, R303 2 kilohms, R305 68 kilohms, R306 10 kilohms, R309 1 kilohm, Q303 type 2N3859, R310 13 ohms, Q305 type 2N3566, R313 220 ohms one-half watt, D304 type SSL35, C302 22 microfarads, P301 50 ohms, R302 36 ohms 1 watt, Q302 type MDR3056, C304 1 microfarad, R304 1 kilohm, R307 47 kilohms, R308 10 kilohms, R311 1 kilohm, Q304 type 2N3859, R312 47 ohms, Q306 type 2N3566, R314 220 ohms one-half watt.

The preamplifier circuitry 331 and 332 of FIG. 11 may have the following exemplary values: R617 4.7 kilohms, C607 0.02 microfarad, C606 100 microfarads, R619 22 kilohms, R620 10 kilohms, R622 1 kilohm, Q606 type 2N3859, R626 22 kilohms (the right hand terminal of resistor R626 connecting with output conductor 335), C609 0.01 microfarad, R618 4.7 kilohm, C608 10 microfarads, R628 47 kilohms, R621 10 kilohms, R623 1 kilohm, Q607 type 2N3859, R627 22 kilohms (the right hand terminal of resistor R627 connecting with output conductor 336), C610 0.01 microfarad.

Main Processing Circuitry of FIG. 9

In an actual arrangement of circuitry, the circuitry of FIG. 11 is interposed between the scanner circuitry of FIG. 8 and the position detector of circuitry of FIG. 10, on the one hand, and the main circuit as indicated in FIG. 9. This relationship is illustrated diagrammatically in FIG. 4. Referring specifically to the input conductors in FIG. 9, input conductors 310 and 312 shown at the upper portion of FIG. 9 come from the scanner processing circuitry shown at the upper part of FIG. 11. The conductors 333–336 shown at the left in FIG. 9 come from the correspondingly numbered output conductors of the mark generator and encoder preamplifiers 331 and 332 shown at the lower left in FIG. 11.

Referring to the upper portion of FIG. 9, the scanner signal at input conductor 310 goes into the clock input of an edge triggered flip-flop 9-74A and also goes into the clock input of a JK flip-flop 9-73A. The leading edge of the scanner signal trips flip-flop 9-74A and the trailing edge trips flip-flop 9-73A. The output from the 9-74A is supplied to NOR gates A02-1, A02-2 and A02-3. Thus a negative-going signal at the upper inputs of gates A02-1 and A02-2 will give a positive pulse of about five microseconds duration at the output of gate A02-2. The lower input to gate A02-3 is maintained at ground potential (GND). When both inputs to gate A02-3 are at ground potential, the output of A02-3 is at approximately plus five volts. Thus the five microsecond positive pulse from A02-2 is transmitted by A02-3 as a negative going pulse of 5 microsecond duration. The output pulse from A02-2 may correspond with the scanner pulse such as indicated at 27a in FIG. 3.

The input pulse at the left in FIG. 9 at conductor 333 may have a wave form as indicated at 23 in FIG. 3. Component 9-13A is a Schmitt trigger circuit so that a positive going signal at the input S thereof will give a negative going pulse at the output having a duration equal to 99 encoder pulses. The negative going output from 9-13A is sent to the lower terminal of C02-1 and the upper terminals of C02-2 and C02-3 so as to produce a positive going reset pulse at the output of C02-3 corresponding to the reset pulse indicated at 24 in FIG. 3. With the output of 9-13A low, a feedback circuit via conductor 335 and resistor R626 serves to maintain the base terminal of Q606 low, giving the circuit an immunity to noise of over one volt and an assurance of an output signal of over two and one half volts.

The output from 9-13A is transmitted by C02-1 as an inverted positive going pulse, the trailing (negative going) edge of which is transmitted via conductor 350 to the upper terminals of NOR gates BO2-1 and BO2-2 so as to produce a positive going reference pulse such as indicated at 25 in FIG. 3 at the output of BO2-2. The reset pulse at the output of CO2-4 has a duration of about five microseconds and is supplied to the clear inputs of 9-73A, 9-74A and 9-74B. The positive going reset pulse at the output of CO2-3 is supplied via conductor 351 to the reset input of error counter 352 at the lower right of FIG. 9 so as to reset the error counter at the beginning of the inspection zone as represented by waveform 26 in FIG. 3.

The reference pulse produced at the output of BO2-2 at the upper right in FIG. 9 also has a duration of about 5 microseconds and is supplied via conductor 353 to the upper input of BO2-3 and to the left hand input of A00-2. The output of BO2-2 is also supplied via conductor 354 to the left hand input of BO2-4.

In order to determine any error in the register condition of the system, the time of occurrence of the reference pulse at the output of BO2-2 on conductor 353 is compared with the time of occurrence of the scanner pulse at the output of A02-3 on conductor 356. More specifically with an enabling potential at conductor 357 leading to the lower input of A00-1, a negative going pulse at input 356 is converted to a positive going pulse at the lower input of BO2-3. The first positive going pulse to arrive at the input to BO2-3 produces a negative going pulse at the clock input at J-K flip-flop 9-73B, producing a positive output at conductor 360 leading from the Q output of 9-73B. This high signal on the upper input of NAND gate B00-4 enables the transmission of double encoder pulses from the encoder doubling circuit 361. The encoder pulses at the output of gate B00-4 are conducted via line 362 to the count input of error counter 352. Referring to FIG. 3g if the scanner pulse occurs first as indicated at 27b, gate B00-4 will be enabled at the time of occurrence of scanner pulse 27 b, and will be disabled at the time of occurrence of the reference pulse which arrives via conductor 353 at the upper input to gate B02-3 after the flip-flop 9-73B has been set by the scanner pulse. Conversely, if the reference pulse 27a arrives first, this pulse will serve to set flip-flop 9-73B to enable gate B00-4, and the scanner pulse as indicated at 27c in FIG. 3h will serve to reset flip-flop 9-73B to disable gate B00-4.

The error counter 352 may comprise two decade counters, for example type SN7490 connected in tandem so as to be capable of counting from zero to 99, so as to obtain a digital measure of any error in registration within this range.

The digital output of each stage of the error counter 352 is supplied via a cable 366 to a digital to analog converter and readout circuit 367. Transistor Q703 has its base electrode coupled with conductor 360 via resistor R710 and diode D702, so that the transistor Q703 suppies an inhibiting potential to conductor 368 of component 367 during the time that the error counter is counting encoder pulses. Thus, the error in the error counter 352 will be displayed at the region 21, FIG. 2, only after the error counter has completed its counting cycle.

The readout circuit of component 367 has two grounded emitter transistor stages (each of a type 2N3566) with a 1 kilohm resistor in series with the base electrode. Conductor 370 at the input to component 367 connects with the 1 kilohm base resistor of one transistor which when energized with a positive potential causes the display 21 to show a positive polarity error, while conductor 371 is connected with the one kilohm base resistor of the other transistor stage which when energized by a high potential signal causes the display to provide a display of the digit 1 signifying a high value of registration error. The presence of a ground potential on conductor 370 may cause display of a minus symbol.

Figure 12:
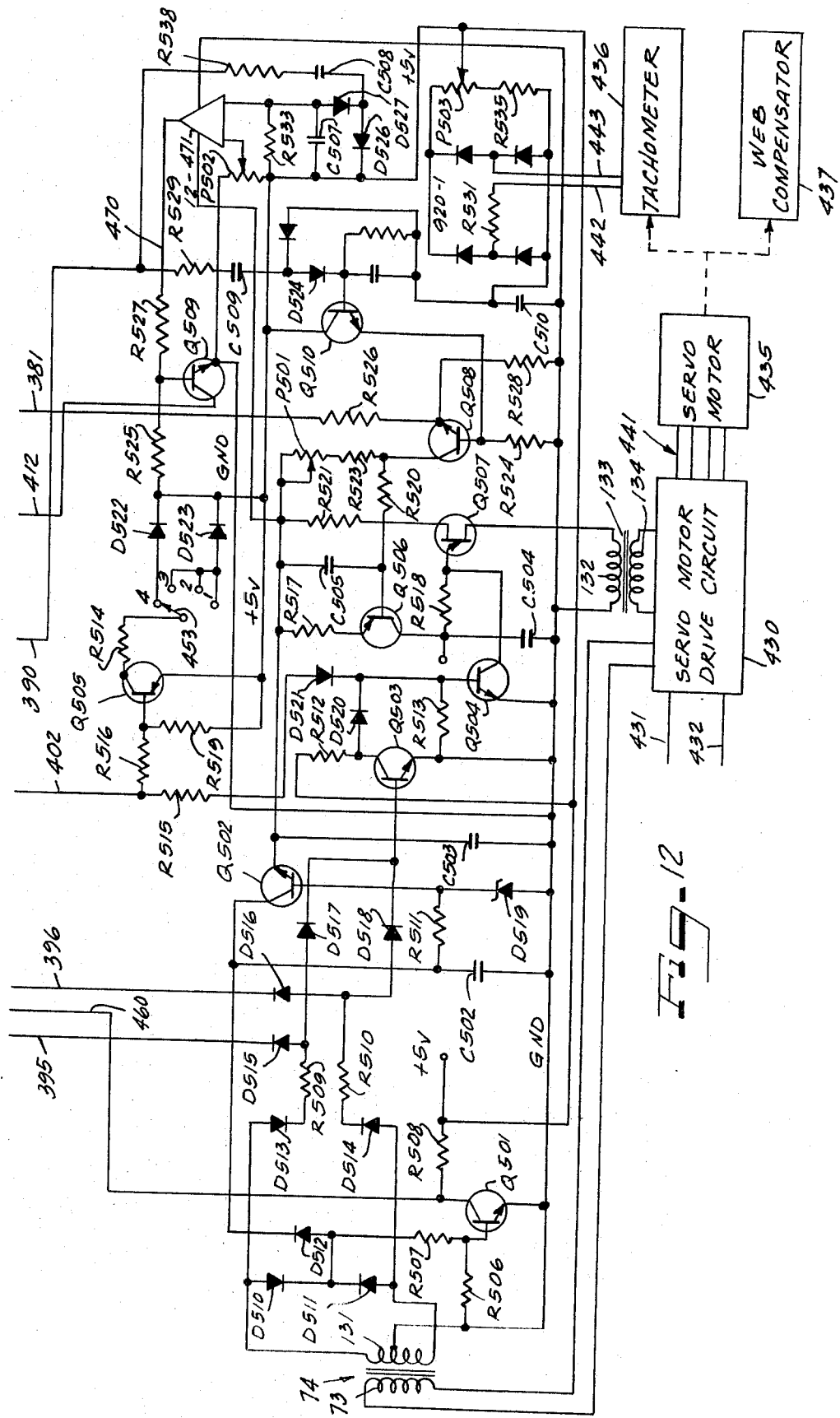
FIG. 12 shows the circuitry for effecting corrective operation in accordance with any error in register.

The digital to analog converter is a straight forward NAND gate driven resistance matrix for supplying a current at output conductor 380 from component 367 proportional to the count value registered by the error counter 352. This output analog error current is supplied via conductor 381 to a motor controller circuit such as shown in FIG. 12.

In the event that a scanner signal such as indicated at 27a in FIG. 3 essentially coincides with the reference pulse 25, the digital circuitry of FIG. 9 operates so as to automatically clear flip-flop 9-73B, so as to disable gate B00-4 and prevent the transmission of encoder pulses to the error counter 352. Specifically the positive going reference pulse is supplied via conductors 353 and 381 to the left hand input of a NAND gate A00-2, while the positive going scanner pulse is supplied to the other input of this gate. If the two input pulses coincide sufficiently, the output of A00-2 will go low so as to actuate a monostable or pulse stretcher circuit composed of NAND gates C00-1, C00-2, C00-3 and C00-4. The output of this circuit is indicated at 384 and connects with the clear input of flip-flop 9-73B. The signal at 384 is such as to override any pulse arriving at the clock input to 9-73B at this time so as to insure that 9-73B remains in a reset condition with the potential condition at output conductor 360 such as to maintain gate B00-4 disabled.

Referring now to the encoder pulse processing circuitry indicated at 361 at the left in FIG. 9, encoder pulses are received via conductor 334 at the input of Schmitt trigger circuit 9-13B which operates in a manner similar to the trigger circuit 9-13A. The output of trigger circuit 9-13B actuates a series of exclusive NOR gates 9-42A, 9-42B and 9-42C. These gates may be type SN8242 and constitute two pulsers in series so that both the negative going and positive going edges of the input signal produce approximately a 4 microsecond output pulse. The output pulses are then combined to produce an encoder pulse train at the output of NAND gate B00-1 corresponding to the encoder pulse train 22 indicated in FIG. 3 and having twice the frequency of the input pulse train arriving at input conductor 334. The encoder pulse train from B00-1 is supplied both to the lower input of gate B00-4 and to a conductor 390 leading to the motor control circuit of FIG. 12.

The means for determining the polarity of any error display by component 367 will now be understood. If, for example, the scanner pulse at the output of A02-3 at the upper right in FIG. 9 occurs first, corresponding to the condition illustrated in FIG. 3g, this pulse is transmitted via conductors 391 and 392 to the lower input of A00-3. This negative going signal causes the output of A00-3 at 393 to go high, applying a positive potential to conductor 370. If then the reference signal at the output B02-2 occurs, this is transmitted by means of conductor 354 and NOR gate B02-4 to supply a negative going signal at the lower input of NAND gate A00-4, providing a high potential output at conductor 395 for signifying to the motor control circuit of FIG. 12 and the correct polarity of the error signal. Conductor 396 is shown as connecting with conductor 393 so as to transmit to the motor control circuit a high polarity signal for the case of a positive polarity error.

The illustrated circuit is provided with certain safety features. For example, the loss of a scanner signal will allow the error counter 352 to reach a count of 99, and NAND gate A20-2 may be connected to the output terminals of stages of the error counter such that at a count of 99 the output of A20-2 will go to ground potential simulating a scanner pulse by means of conductor 357 leading to gate A00-1 and supplying a ground potential to conductor 400 for disabling gate A20-1. The output of A20-1 at conductor 401 is supplied to the motor output circuit via conductor 402 to prevent operation of the compensator roller 17, FIG. 1, from the motor circuit of FIG. 12.

The low potential condition at the output of A20-2 is also transmitted to conductor 405 via conductor 400 so as to transmit a low potential condition to conductor 312 and maintain transistor Q605 of FIG. 11 in the non-conducting condition.

Referring to the output conductor 410 at the output of NOR gate C02-1 at the left in FIG. 9, this conductor will serve to forward bias diode D701 during the time that a mark generator pulse is being transmitted by trigger circuit 9-13A at the left in FIG. 9. This permits transistor Q703 at the lower part of FIG. 9 to supply a blanking pulse at output conductor 368 which is wide enough to correspond to the mark generator pulse 23, FIG. 3. Further, if the scanner pulse lags the reference pulse as indicated in FIG. 3h, the reference pulse 25 at the trailing edge of the mark generator pulse 23 will serve to set J-K flip-flop 9-73B so that output conductor 360 therefrom will forward bias diode D702 to maintain transistor Q703 in the on condition until the scanner pulse 27c, FIG. 3, has been received. The mark generator pulse 23 corresponds to 18° of revolution of the position detector assembly 231 and this corresponds to 50 encoder pulses as produced by the position detector and 100 of the doubled encoder pulses as represented at 22 in FIG. 3. The inspection zone 26 therefore is at least 100 counts long since reset pulse 24 resets the scanner input flip-flops and resets the error counter 352 so as to place the circuit in condition for counting of a new error signal any time that a scanner signal such as indicated at 27b should occur thereafter. The ground signal from the collector of Q703 to the lower input of gate A20-1 supplies a high potential to conductors 401 and 402 during the interval of permitted error counting so as to prevent operation of the compensating motor during this interval. The inspection zone as indicated at 26 in FIG. 3 is 100 encoder pulses in duration as a minimum corresponding to the duration of the mark generator pulse 23, and it can be 200 counts maximum where the scanner fails to occur, and gate A20-2 at the lower right in FIG. 9 is actuated when the error count reaches 99. Thus, the inspection zone indicated at 26 in FIG. 3 may be considered the potential level at conductor 402 shown at the lower left in FIG. 9. The gate A20-1 and NAND gate B00-3 are wired in a RS flip-flop configuration so that when this circuit is in the set condition with conductor 401 high, the compensating motor is disabled through the motor controller circuit of FIG. 12, and when the circuit is in the reset condition with conductor 401 as ground potential, the motor controller is able to function. All of the inputs of gate A20-1 must be high before the RS circuit is reset to provide an enabling ground potential at conductor 401. Conductor 412 which leads to one of the inputs of A20-1 comes from the motor control go down circuitry which is illustrated in FIG. 12. This conductor will have a high potential when the input shaft 200, FIG. 6 is operating at a suitable relatively high speed above a predetermined minimum value.

NAND gates A00-3 and A00-4 are also wired in an RS configuration with inputs at 392 and 414 representing the condition of the scanner circuit and the reference circuit, respectively, so that the end of the inspection zone, this flip-flop is in a condition according to which of the scanner pulse and reference pulse was last received. If the reference pulse is last received, output conductor 395 will be high and conductor 393 will be low activating the readout 21 of FIG. 2 with one polarity. If the scanner pulse is last received, output conductor 393 will be high and output conductor 395 will be low, and the display 21 will appear with the opposite polarity of error reading. Conductors 392 and 414 may be interchanged as indicated by the crossed dashed lines so as to reverse the polarity of the error signal. The compensating motor will then run in the opposite direction for a giving timing relationship between the reference signal and the scanner signal.

Exemplary Circuit Values For FIG. 9

The following are the exemplary circuit values for the circuit board of FIG. 9: R713 1 kilohm, D704 type 1N658, D705 type 1N658, 9-73A type SN7473, 9-74A and 9-74B type SN7474, C712 one tenth microfarad, C711 one tenth microfarad, C706 one tenth microfarad, R709 2.2 kilohms, R711 2.2 kilohms, R712 1 kilohm, D701 type 1N658, C705 0.01 microfarad, C707 0.01 microfarad, D702 type 1N658, D703 type 1N3125, R716 390 ohms, C709 0.01 microfarad, C710 0.1 microfarad, R710 2.2 kilohms, Q703 type 2N3566.

Motor Control Circuit Of FIG. 12

FIG. 12 illustrates the motor control circuit for controlling compensator roller 17, FIG. 1, in accordance with the analog error signal supplied via conductors 380 and 381 from converter readout component 367 shown at the lower center part of FIG. 9. Other inputs to FIG. 12 are the doubled encoder pulses supplied via conductor 390, a motor inhibit signal supplied via conductor 402, and error directional signals via conductors 395 and 396.

To assist in correlating FIG. 12 with FIG. 5 of the drawings, a servo motor drive circuit is indicated at 430 which would include components such as 135–138 of FIG. 5 as well as the switching circuitry shown at the left in FIG. 5. The drive circuit 430 would receive commercial alternating power at inputs 431 and 432, and upon actuation of power switch 37, FIG. 2 would supply such alternating current power to primary winding 73 of transformer 74. The drive circuit 430 would be connected with servo motor 435 so as to control energization of the armature circuit thereof indicated at 101–105 in FIG. 5 and so as to control energization of the field winding circuit as indicated at 107 in FIG. 5. Servo motor 435 is shown as having drive coupling with a tachometer 436 and with a web compensator device 437 suitable for controlling the position of the compensating roller 17, FIG. 1. Thus, the electrical coupling represented at 440 in FIG. 1 would including the electrical connection indicated at 441 in FIG. 12 between drive circuit 430 and servo motor 435 and would also include conductors 442 and 443 connecting the tachometer 436 with the motor control circuit of FIG. 12.

The servo motor 435 may have an output speed which varies from zero to 28 revolutions per minute depending on the signal supplied to transformer 133 by the motor controller circuit of FIG. 12. The tachometer 436 is located in the motor housing and supplies a feedback signal via conductors 442 and 443 while the compensator 437 is being operated by the motor. The control supplied by transformer 133 is bidirectional and proportional to the error magnitude, machine speed and motor load. The machine speed is determined by integrating encoder pulses supplied to the circuit via conductor 390. The motor load is determined by the tachometer feedback at conductors 442 and 443. Motor operation is also controlled by the amplifier gain control indicated a 39 in FIG. 2 which is mechanically coupled with potentiometer P501 of FIG. 12. Light emitting diodes D522 and D523 in FIG. 12 control illumination at the automatic mode indicator 450 and the ready indicator 451 appearing at the front of the control panel as represented in FIG. 2. The function knob 34 is mechanically coupled to selector switch 453, FIG. 12, which is shown in the number 4 auto position in conformity with the position of selector switches 61–65 of function switch 34.

In automatic operation of the circuit of FIG. 12, if a reference pulse 25 arrives prior to scanner such as indicated at 27c in FIG. 3, diode D515 is reverse biased by virtue of the high potential condition at conductor 395 at the upper left in FIG. 12, and diode D516 is forward biased by virtue of the ground potential applied to conductor 396. Diodes D517 and D518 serve to clip respective positive going pulses from the full wave rectifier associated with transformer secondary 131. For an error in one direction, alternate pulses from secondary 131 are blocked by the ground potential at conductor 396. For an error of the opposite polarity, the other sequence of alternate pulses is blocked by virtue of the ground of the ground potential at conductor 395. The circuit including transistor Q502, Zener diode D519, resistor R511 and capacitor C502 form a constant voltage regulator for this circuit. Transistor Q501 will be turned off between cycles to reset the inhibit gate B00-2 shown at the lower left in FIG. 9 by means of the high potential supplied to conductor 460 at this time. Until this reset signal is supplied to conductor 460, the output of gate A20-1 shown at the lower left of FIG. 9 will be high, producing a high potential at conductor 402 and thus maintaining transistor Q505 in the off condition. Thus diode D522 will be deenergized and the indicator 450 associated therewith will not be illuminated. Further, the high potential at conductor 402 will forward bias diode D521 to turn transistor Q504 on and thus prevent firing of the unijunction transistor Q507. Thus until the RS flip-flop formed by A20-1 and B00-3 in FIG. 9 is reset by means of transistor Q501, no pulses can be supplied to primary 132 of the triac transformer 133. This circuitry serves to insure that the triac 135 of the drive circuit 430 will fire at the beginning of a cycle where required by a large error to be corrected.

Referring to transistor Q703 at the lower center part of FIG. 9, it will be recalled that this transistor is maintained on for the duration of the inspection zone represented at 26 in FIG. 3. The inspection zone begins witgh the occurrence of a reset pulse 24, and ends either with the occurrence of the reference pulse 25, where the scanner pulse occurs as indicated at 27a or 27b, or with the occurrence of a scanner pulse lagging the reference pulse as indicated at 27c in FIG. 3. While in the absence of a scanner pulse, the inspection zone may be terminated at an error count of 99 as indicated at 26a in FIG. 3, this would represent an abnormal operation of the system. The on condition of transistor Q703 during the inspection zone 26 of each cycle supplies a ground input to gate A20-1 and thus produces a high potential condition at conductor 402 for the duration of the inspection zone. If there is a large error present during the cycle, triac 135 of the drive circuit 430 should begin conducting at the beginning of a cycle of the alternating current power supplied to circuit 430, and the control transistor Q504 insures that this will be the case even though the inspection zone terminates at a subsequent point in the desired half cycle of the alternating current power waveform. The servo motor 435 will thus be driven in proportion to the error and in the direction for compensating for the error from end of the inspection zone of one cycle to the beginning of the inspection zone of the next cycle in normal automatic operation.

The control signal for controlling the timing of the firing of Q507 is applied to the base of Q506 in such a way that the larger the magnitude of the error, the greater the current flow in Q506, and the more rapidly capacitor C504 is charged. When the potential on capacitor C504 reaches the breakdown point of the emitter of Q507, capacitor C504 discharges through Q507 energizing the pulse transformer 133. If at any time during operation, the scanner 14, or position detector 10 should fail to supply signals, or if the error counter 352 reaches a count of 99, conductor 401 at the output of gate A20-1 shown at the lower left in FIG. 9 goes high, turning on Q504 and placing a ground potential on the emitter of Q507. This prevents firing pulses from being generated in the event of a malfunction of the system.

The voltage supplied to the base of Q506 which controls the strength of the firing pulses is affected by the amplifier gain, the speed of the press, the magnitude of the error, and the voltage supplied by tachometer 436. The output of the tachometer 436, which is a negative voltage, is fed to the base of Q510 to reverse bias this transistor. Potentiometer P503 is adjusted to feed voltage to the base of Q510 in opposition to the voltage generated by tachometer 436.

Encoder pulses from conductor 390 are introduced to the circuit of FIG. 12 through R529 and C509. As the encoder pulse rate increases corresponding to an increase in the speed of the press, diode D524 becomes forward biased and applies a positive voltage to the base of Q510. As previously mentioned, the speed of tachometer 536 also affects the bias at the base of Q510.

The emitter of Q510 is connected to the base of Q508, bringing a potential proportional to tachometer and press speed to this common point. The emitter of Q508 is also connected to the output 380 of the digital to analog converter of component 367, FIG. 9, via conductor 381. Thus the current to the emitter of Q508 is determined by the analog error signal from the digital to analog converter. When Q510 is turned on, a positive voltage is placed on the base of Q508, turning it on. The collector of Q508 is connected to the base Q506 through R520 when Q508 is on so as to forward bias Q506. Thus the rate of charging of capacitor C504 is a function of press and tachometer speed and also a function of the analog error from component 367, FIG. 9. In effect, therefore, the motor control circuit of FIG. 12 serves to multiply the magnitude of the error times the sum of the tachometer feedback signal and the press speed signal, and serves to time the trigger pulses supplied to transformer 133 in accordance with the direction of the error as applied to input conductors 395 and 396. Thus servo motor 435 is operated in a direction to correct for the error and at a speed which is a function of the magnitude of error times the sum of tachometer feedback and press speed. Thus the degree of energization of servo motor 435 is a function not only of the magnitude of the error but also a function of the load on the servo motor and the speed of the press. Capacitor C506 serves to integrate encoder pulse rate so that the voltage across capacitor C506 has a direct current level whose average value is proportional to the speed of the position detector assembly 231, FIG. 6.

The manner in which TRIAC 135 controls the polarity of energization of the armature circuit 101-105 of servo motor 435 can be visualized from FIG. 5. Thus, if TRIAC 135 is turned on during half cycles when terminal 72 is going positive relative to terminal 71, positive current flow will be in the direction indicated by arrow 461 in FIG. 5. For opposite polarity of error, TRIAC 135 will become operative in opposite half cycles when terminal 71 is going positive relative to terminal 72, so that current flow will be in the direction indicated by arrow 462 through armature winding 101. In position number 1 of selector 62, the direction of current flow through the circuit of motor 264 would similarly be controlled by TRIAC 135 in accordance with the error direction signals applied to conductors 395 and 396 in FIG. 12.

The use of TRIAC 135 provides regenerative drive to the motor 435. That is to say, if the load on the servo motor 435 were operating at such a speed as to tend to drive the servo motor 435 due to the inertia of the load, drive circuit 430 would plug or reverse fire the motor to apply a braking force. Thus, if the system is operating with a fairly large error which suddenly diminishes, circuit 430 will plug or reverse fire the motor circuit so as to slow the motor down to the lower speed represented by the reduced error. To do this, a TRIAC 135 is used with a capacitor 137 and resistor 138 shunting the TRIAC as shown in FIG. 5. Thus, when the motor is running at a given speed and produces an armature back voltage proportional to this speed, the back voltage peak value may be about three-fourths of the peak supply voltage applied at terminals 71 and 72 in FIG 5. Thus, if the motor should suddenly be running faster than required by the error in registration of the web, the voltage across the TRIAC might actually be in a reverse direction, so as to produce a surge of armature current through capacitor 137 and through the armature circuit 101-105 in the reverse direction. This reverse energization would serve to brake the motor very rapidly until the armature back voltage was reduced to a point where the TRIAC was no longer supplying inadequate energization.

In the circuit of FIG. 12 at the upper right, potentiometer P502 serves to adjust the "go down" speed below which the system is disabled. The potentiometer P502 may be adjustable, for example, to cause operation of amplifier 12-471 for speeds between 0 to 100 revolutions per minute of cutting cylinder 16 and position detector 10, FIG. 1. If the speed falls below the selected value, a go-down signal at conductor 470 at the output of amplifier 12-471 serves to turn-on transistor Q509 to supply a ground potential to conductor 412 so as to actuate the fail-safe circuit including gate A 20-1 of FIG. 9.

Referring to analog error control conductor 381 of FIG. 12, this conductor will have a potential of at least about four volts for a zero error so as to shut-off transistor Q508. For an error count of eight, the analog voltage at 381 may reduce to approximately 3 volts, while for an error of 99, the potential would be approximately 1 volt.

Referring to FIG. 9, when the error counter 352 reaches a relatively high count, for example, a count of 80, a high potential may be applied to conductor 470 leading to NOR gate A02-4 at the right central part of FIG. 9 so as to provide a positive going signal at 471 leading to the clock input of flip-flop 9-74B when the error count reaches 100. Setting of flip-flop 9-74B provides a ground potential of conductor 472 which will then serve to produce a maximum analog error signal at conductor 381 leading to the circuit of FIG. 12. Thus, at any error magnitude in excess of 100, for example, the potential supplied to the emitter of Q508 may be in the neighborhood of zero volt. The Q output of flip-flop 9-74B may be supplied to a conductor 473 which may control a suitable display element at the display region 21 in FIG. 2. For example, the read out tube (for example a Numitron type DR2020) may indicate a minus sign when the scanner signal arrives before the reference signal, a plus sign when the opposite occurs, and the numeral 1 for the case where the flip-flop 9-74B is set to indicate a high error counts. The tens and units display units for display region 21 may comprise Numitron type DR2010 units. The drivers for these units may be integrated circuits type CD2501 with seven output lines controlling respective seven straight line segments for the display digits.

Exemplary Circuit Values for the Components of FIGS. 5 and 12 Circuit Values for FIG. 5

The following components were utilized in a commercial circuit in accordance with FIG. 5: diodes 81 and 82 type 1N2071, diodes 91 and 92 type 1N5627, diodes 93 and 94 type 1N2071, diode 108 type 1N2071, diode 83 type 1N2071, diodes 104 and 105 type 1N5627, resistor 109, 500 ohms 5 watts, transformer 133, pulse transformer type 31Z323, resistor 136 10 ohms one-half watt, capacitor 127 0.1 microfarad, resistor 138 100 ohms 1 watt, transformer 74 type 36 VCT, diodes 123 and 124 type 1N2071, resistor 113 47 ohms, 2 watts, resistor 112 500 ohms, 8 watts, resistor 110 820 ohms, 2 watts.

Exemplary Component Values for FIG. 12

The following are the circuit values for components not referred to above in reference to FIG. 5: D510 through D514 tye 1N4001, R506 47 kilohms, R507 22 kilohms, R508 10 kilohms, Q501 type 2N3704, R509 22 kilohms, R510 22 kilohms, D515 and D516 type 1N658, D517 and D518 type 1N658, R511 2.2 kilohms one-half watt, C502 50 microfarads, D519 type 1N1779, Q502 type 2N2102, C503 50 microfarads, R512 2.2 kilohms, D520 and D521 type 1N658, Q503 type 2N3704, R513 10 kilohms, Q504 type 2N3416, R515 2.2 kilohms, R516 2.2 kilohms, R519 1 kilohm, Q505 type 2N3638, R514 100 ohms one-half watt, R517 1 kilohm, Q506 type 2N4249, R518 47 ohms, C504 1.0 microfarad, C505 0.01 microfarad, R520 1 kilohm, Q507 type 2N2646, R521 620 ohms, D522 and D523 type 5022, R525 1 kilohm, R527 10 kilohms, Q509 type 2N3704, P501 25 kilohm (gain potentiometer) R523 4.7 kilohm, Q508 type 2N5226, R524 2.2 kilohm, Q509 2N3704 R527 10 kilohms, R529 10 kilohms, C509 0.01 microfarad, Q510 type 2N3566, R528 39 kilohm, D524 and D525 type 1N459, R530 100 kilohms, C506 1.0 microfarad, C510 4.7 microfarad, P502 10 kilohms (go-down potentiometer), R533 100 kilohms, C507 1.0 microfarad, diodes D526 and D527 type 1N459, R538 1 kilohm, C508 0.01 microfarad, 920-1 bridge rectifier MDA920-2, R531 10 kilohm, P503 2 kilohms (speed potentiometer), R535 1 kilohm, tachometer 436 type M176T6.

Summary of Features of FIGS. 5 and 8-12

General features of the illustrated register control system relate to the provision of an inexpensive solid state digital circuit requiring a minimum number of filament heating circuits. The scanner circuit of FIG. 8 is designed so as to requre no potentiometers and the like for adjusting the circuit to discriminate marks of differing color, density, size and background.

A particular feature of the circuit of FIG. 8 relates to the provision of a scanner system for responding to pulse signals from phototransistor Q201 of widely varying duration including very long pulse durations in the neighborhood of 1 second, for example. The circuit includes an input field effect transistor Q202 connected with the phototransistor Q201 to provide voltage amplification of the scanner pulses. A further field effect transistor Q203 is couped with transistor Q202 by means of capacitor C202 and provides for power amplification of the scanner pulses. The field effect transistors Q202 and Q203 are selfbiased and capacitively coupled so as to require essentially no bias and sensitivity adjustments while operatively responding to the pulse signals of widely varying duration. By way of example, the scanner circuits should be capable of responding to scanner frequencies in the neighborhood of 20 scanner pulses per minute.

The circuits of FIGS. 8, 10 and 11 are preferably capable of processing the scanner, encoder and position detector pulses so as to feed directly into transistor transistor logic.

While in the illustrated circuit of FIG. 9, the mechanical encoder pulses are from position detector 10 are doubled to supply 2000 encoder pulses per revolution, the doubling circuit would not be required, for example, if encoder disk 211 of FIG. 6 were provided with 2,000 slots. As an alternative to be described hereinafter, the doubled encoder pulses may be further tripler by means of the circuit illustrated in FIG. 13 to provide 6,000 encoder pulses per revolution of the positioned detector assembly 231.

A particular feature of the scanner processing circuit 311, FIG. 11, enables optimum discrimination between the raw scanner pulses and noise signals. This circuit includes a capacitor charging circuit including R610, C604 and R612 for charging capacitor C604 to a reference voltage of the order of plus 5 volts in the absence of a signal, and a capacitor discharge circuit for discharging capacitor C604 in response to scanner signals, the capacitor being discharged to a direct current level proportional to the peak signal amplitude, and the discharge circuit including the base-emitter junction of transistor Q603 such that the transistor is driven by the restoring current as the capacitor C604 is discharged. The recharging of the capacitor C604 from the direct current level by the charging circuit (R610, R612) is with a time constant substantially greater than the time constant of the discharge circuit so that the capacitor C604 operates as an inverted direct current restorer, but the time constant of the charging circuit being consistent with substantial scanner pulse frequencies such as a frequency of 20 scanner pulses per minute.

A feature of the motor control circuit of FIGS. 5 and 12 resides in the provision of a regenerative control circuit for motor 435 including bidirectional thyristor means 135-138, FIG. 5, for responding to a back voltage of the armature circuit 101-105, FIG. 5, of motor 435. Thyrister 135, FIG. 5, controls the application of alternating current supply potential to the motor armature circuit, and transformer 74 serves as a coupling means for coupling the alternating current supply to the control circuit of FIG. 12. The drive control circuit of FIG. 12 is responsive to an error count in each cycle of operation of the control system to control the turn-on angle of the thyristor 135 via pulse transformer 133. The coupling means further includes a direction circuit including conductors 395 and 396 and transistor Q503 for insuring that the proper polarity of driving current is supplied to the motor 435. The coupling means further includes a transistor Q504 which is responsive to a control potential at conductor 402, FIG. 12. Before the potential at conductor 402 will enable operation of transistor Q507 by turning off transistor Q504, a signal must be transmitted from transistor Q501 via conductor 460. The signal at conductor 460 in turn is only generated after a complete cycle of the input power to transformer 74, and thus transistor Q507 can only be triggered under the control of a complete cycle of the alternatig current power. The coupling means including transistors Q501 and Q504 thus serve to activate the circuit for transistor Q507 in each cycle of the system at a predetermined point of the supply wave form such that the motor 435 will be operated by the drive means of FIG. 12 correctly in proportion to the error count while avoiding any error in the firing of the thyristor 135 as the drive circuit means is first activated at the end of the inspection zone 26. The thyristor means responds to excessive back voltage in the motor armature circuit in the case where the motor load is running in excess of the speed required by the error signal so as to reverse energize the motor armature circuit.

Summary of Operation

In setting up the registered control, the press may be set in operation and the register condition at the cut-off cylinder 16 may then be approximately established with function switch 34 in the number three manual compensation position. When the register condition is approximately obtained, the function switch 34 may be shifted to the number two position, the manual reference generator position, and the rocker switch 30 actuated until the error read-out at window 21, FIG. 2, shows an error below 99. The function switch 34 may then be shifted to the number one automatic set-up position, whereupon the control circuit 130, FIG. 5, automatically controls the motor 264 so as to angularly adjust the light pipe 241, FIG. 6, to correspond to the register condition. When the read-out numbers at the indicator 21 are around zero, (zero plus or minus two or three counts), the function switch 34 is moved to the number four automatic register control position, whereupon the control circuit 130 which represents, for example, the detailed circuitry of FIGS. 8–12, controls servo motor 435, FIG. 12, so as to automatically maintain the established register condition.

In the illustrated embodiment, each revolution of the cut-off cylinder 16 results in the production of a mark generator pulse as indicated at 23 and a series of 1,000 encoder pulses which are supplied from position detector 10 to the control unit 18 as represented at 329 in FIG. 1. During the same cycle of operation, scanner 14, FIG. 1, will respond to a suitable mark on the web 12 so as to produce a scanner pulse such as indicated at 27a which will coincide in time with a reference pulse 25 when the printing on the web 12 is properly positioned relative to the cutting cylinder 16. When the scanner pulse produced at scanner 14 occurs as indicated at 27b in FIG. 3 in advance of the reference pulse 25, an error counter 352, FIG. 9, begins counting encoder pulses as represented at 22, FIG. 3, at the time of occurrence of pulse 27b, and ceases the counting at the occurrence of the reference pulse 25. At the end of the error counting interval, read-out display 21 is enabled so as to display the count from the error counter 352. At the same time, the error count in counter 352 is supplied as indicated at 366 in FIG. 9 to a digital to analog converter circuit of component 367 which supplies a proportionate analog error signal at output 380. This output connects with a conductor 381 leading to the motor control circuit of FIG. 12 where the analog error signal is supplied to the emitter of Q508. Encoder pulses are supplied via conductor 390 to the circuit of FIG. 12 and serve to produce a proportionate signal at the base of Q510 which is transmitted to the base of Q508. Similarly a tachometer feed back signal is supplied from tachometer 436 to the base of Q510, so that the output of Q508 is a function of analog error, press speed, and load on the servo motor 435 as expressed in speed of tachometer 436. The combined signal is supplied to the base of Q506 and serves to control the rate of charging of capacitor Q504. This in turn times the triggering of Q507 which controls the supply of a driving pulse to pulse transformer 133. As shown in FIG. 5, pulses from secondary 134 of pulse transformer 133 are applied to TRIAC 135 so as to control the polarity and magnitude of the signal supplied to the armature circuit 101–105, FIG. 5, of the servo motor 435, FIG. 12.

The phase of the turn-on signal supplied to Q507, FIG. 12 is coordinated with the phase of the alternating current power supplied at terminals 71 and 72 in FIG. 5 by means of transformer 74 which couples the TRIAC supply voltage with the circuit of FIG. 12. Thus, referring to FIG. 12, the alternating current potential at secondary 131 is synchronized with the alternating current potential applied across TRIAC 135 and armature 101 of motor 435. The polarity of the half cycles energizing the TRIAC is controlled by means of conductors 395 and 396 FIG. 12, so that Q504 disables Q507 during the half cycles of the alternating current power wave form which represent the incorrect polarity.

In the illustrated embodiment, a signal at conductor 402, FIG. 12, maintains Q504 conducting during the error counting cycle, so that correction signals are applied to the motor 435 only after the error count has been accumulated. To avoid turning on Q504 at a random point in the power half wave cycle to be controlled by Q507, a transistor Q501 is coupled to the input alternating current power from secondary 131 and provides a reset signal at conductor 460 which must occur before Q504 is turned off at the end of the counting cycle. Thus, Q507 is always enabled at a predetermined point in the wave form of the power supply to the TRIAC so as to avoid any error in firing of the thyristor 135 as the control transistor Q507, FIG. 12, is first activated in each cycle of operation of the system.

Referring to FIG. 5, if the servo motor should begin to overrun at a point where the error is suddenly reduced, the TRIAC circuit 135–138 is such that the back voltage at the armature winding 131 of the motor will control the TRIAC 135 so as to tend to reverse energize the motor and rapidly reduce the speed thereof into conformity with the reduced error signal.

Modification of FIGS. 13 and 14

Where it is desired to triple the mechanical encoder pulses supplied by position detector 10, the embodiment of FIGS. 13 and 14 may be connected in place of circuit 332 between output conductor 327 at the lower part of FIG. 10 and input conductor 334 at the left in FIG. 9. Where the doubler circuit 361 of FIG. 9 is also retained, the mechanical encoder pulse frequency of 1,000 pulses per revolution would be multiplied by six to provide 6,000 pulses per revolution at the output of gate B00-1 in FIG. 9. In FIG. 13, reference numeral 13-327 has been applied to the input conductor of the circuit to indicate the correlation with conductor 327 at the right in FIG. 10, and reference numeral 13-334 has been applied to the output conductor to show the correlation with conductor 334 at the left in FIG. 9.

The input signal at conductor 13-327 is represented in FIG. 14a and is supplied to each of the circuit branches 13-1, 13-2 and 13-3. The first branch 13-1 serves to clamp the negative peaks of the input signal to ground potential, and to clip the positive peaks to the input waveform so as to produce a square wave as indicated at 13-4 in FIG. 14b as observed at point A, for example, in branch 13-1. Transistor 13Q2 serves to amplify waveform 13-4 and supply the same to the output 13-34.

In the second branch 13-2, the positive going peaks of the input waveform serve to recharge capacitor 13C3, producing a pulse beginning at about 60 electrical degrees relative to the input waveform, and producing an output contribution as indicated at 13-5 in FIG. 14c at the collector of 13Q4.

Branch 13-3 operates in a similar fashion with respect to the negative going half wave cycles of the input waveform so as to produce an output contribution as indicated at 13-6 at the collector of 13Q6.

FIG. 14e shows the net output at 13-334 as a result of the respective contributions of FIGS. 14b, 14c, and 14d.

It is found that the circuit of FIG. 13 will tolerate a plus or minus 50% amplitude change within a time interval corresponding to four cycles of the input waveform, with an average input of from 2 volts to 6 volts peak-to-peak, while supplying an output frequency or pulse rate of 100 kilocycles per second.

The Branch circuit 13-1 is capable of responding to substantially distorted inputs and still produce the triple pulse rate output. For example, if the input waveform of FIG. 14a is distorted such that the portions R of waveform 3-4 increase in length, the S portions of waveform 13-5 will also increase, portions $\overline{R}$ of waveform 13-4 and portions T of waveform 13-6 decreasing in time duration.

The circuit will tolerate a 500 cycle per second input without producing overlapping output pulses. Much higher input voltages and input voltage amplitude change tolerances can be accepted with a higher reverse base-emitter characteristic of transistors 13Q1, 13Q3, and 13Q5, or by adding diodes in series with the emitters of these transistors.

Exemplary Circuit Values for FIG. 13

The following are exemplary parameters for the circuit of FIG. 13: 13R1 1 kilohm, 13C1 10 microfarads, 13D1 type 1N3125, 13Q1 type 2N1304, 13R2 10 kilohms, 13R3 10 kilohms, 13R4 4.7 kilohms, 13Q2 type 2N3566, 13R5 2.2 kilohms, 13C2 0.001 microfarad, 13C3 1 microfarad, 13R6 10 kilohms, 13Q3 type 2N1305, 13R7 10 kilohms, 13Q4 type 2N3566, 13R10 10 kilohms, 13Q5 type 2N1304, 13R11 10 kilohms, 13C4 1 microfarad, 13D2 and 13D3 type 1N4156, 13R12 4.7 kilohms, 13Q6 type 2N3566, 13R8 10 kilohms, 13R9 4.7 kilohms.

I claim as my invention:

1. A web control system for maintaining a register condition between successive repeat lengths of a moving web and a cyclically operating work applying means which acts on the web at a work location along the path of movement of the web, so as to tend to cause the work applying means to act on the web at a predetermined work-receiving region of each succesive repeat length of the web, said web control system comprising an encoder for generating encoder pulses as a function of successive increments of web movement, an error counter connected with said encoder and operable for counting encoder pulses.

a counter control circuit connectd with said error counter for controlling the counting of encoder pulses thereby, and responsive to a timing error in the arrival of a work-receiving region of the web at the work location in a cycle of operation of the work applying means to cause the error counter to count encoder pulses for the duration of the timing error, thereby to generate an error count in said error counter for such cycle of operation.

a digital to analog converter connected to the error counter and operable for generating a analog error signal in accordance with the error count in said error counter, a blanking circuit operable for generating a blanking signal during the time that the error counter is counting encoder pulses in each cycle of operation, an error correcting motor having an armature circuit producing a back voltage as a function of the speed thereof, a regenerative control circuit for the motor including bidirectional thyristor means for responding to the back voltage of the armature and having an alternating current supply for applying energy to the motor armature circuit under the control of said thyristor means, drive circuit means connected to said digital to analog converter for receiving the analog error signal therefrom and operable to control the turn-on angle of the thyristor means in accordance therewith so as to tend to reduce the timing error and thus to restore the register condition, said drive circuit means connected with said blanking circuit and being responsive to said blanking signal to prevent operation of said error correcting motor for the duration of said blanking signal, and to enable the drive means at the termination of said blanking signal in each cyle of operation, and coupling means for coupling to the thyristor alternating current supply for activating said drive circuit means in each cycle at a predetermined point of the supply waveform such that the motor will be operated by said drive circuit means in proportion to the analog error signal while avoiding any error in firing of the thyristor means as the drive circuit means is activated in each cycle of operatin under the control of said blanking circuit, the thyrister means responding to excessive back voltage of the motor to reverse energize said motor.

\* \* \* \* \*